(12) United States Patent
Chan et al.

(10) Patent No.: US 6,829,765 B1
(45) Date of Patent: Dec. 7, 2004

(54) JOB SCHEDULING BASED UPON AVAILABILITY OF REAL AND/OR VIRTUAL RESOURCES

(75) Inventors: Waiman Chan, Poughkeepsie, NY (US); Margaret M. Curry, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 09/618,920

(22) Filed: Jul. 18, 2000

(51) Int. Cl.[7] ............................................... G06F 9/00

(52) U.S. Cl. .................. 718/104; 718/102; 718/100

(58) Field of Search ................................ 718/100, 102, 718/103, 104, 220, 222, 223; 709/100, 101, 102, 103, 104, 223, 226; 717/127; 705/8

(56) References Cited

U.S. PATENT DOCUMENTS

| | | | | |
|---|---|---|---|---|
| 5,233,533 A | * | 8/1993 | Edstrom et al. | 700/103 |
| 5,274,813 A | * | 12/1993 | Itoh | 717/127 |
| 5,369,570 A | * | 11/1994 | Parad | 705/8 |
| 5,542,088 A | | 7/1996 | Jennings, Jr. et al. | 395/650 |
| 5,668,993 A | | 9/1997 | Peters et al. | 395/671 |
| 5,819,033 A | | 10/1998 | Caccavale | 395/200.11 |
| 5,860,137 A | | 1/1999 | Raz et al. | 711/202 |
| 5,924,093 A | | 7/1999 | Potter et al. | 707/7 |
| 5,944,809 A | | 8/1999 | Olarig et al. | 710/260 |
| 5,964,838 A | | 10/1999 | Cheung et al. | 709/224 |
| 6,282,561 B1 | * | 8/2001 | Jones et al. | 709/104 |

* cited by examiner

Primary Examiner—Majid A. Banankhah
(74) Attorney, Agent, or Firm—Lawrence D. Cutter

(57) ABSTRACT

A model for computer resources based on type and amount is employed in a consistent manner across several layers in a data processing system as a mechanism for providing users with significantly more control over the allocation, utilization and scheduling of resources for user's software applications running on the target computer system.

4 Claims, 2 Drawing Sheets

JOB SCHEDULING BASED UPON AVAILABILITY OF REAL AND/OR VIRTUAL RESOURCES

BACKGROUND OF THE INVENTION

The present invention is generally directed to systems and methods for scheduling jobs running on a data processing system. More particularly, the present invention is directed to providing user control of a wide range of computer related resources which exists at a plurality of levels within a data processing system. Even more particularly, the present invention is directed to the utilization of a consistent set of resource models extending over different data processing levels from a low hardware level through the operating system level and onto an administrative and user level.

With the proliferation of data processing systems employing multiple processors it has typically been the role of the operating system to schedule jobs based upon job descriptions provided by system users. In contrast, the present invention breaks away from this modality by providing mechanisms for much greater user involvement in the utilization of data processing system resources.

In particular, it is noted that the increased use of data processing systems employing multiple processors particularly in a symmetric multiprocessing (SMP) environment, there has been provided an opportunity for various tasks associated with a user's job to be run on selected ones of a number of processing units. Accordingly, the present invention includes a mechanism for user controlled association of various job tasks with particular processors. Accordingly, this permits greater control of the data processing operation by an entity which is most familiar with the structure of the program or application, namely the user of application software. For example, users running application programs which are particularly susceptible to parallelization are provided with a specific mechanism for linking various job tasks with different processors.

While it is noted that the present invention is particularly directed to symmetric multi processing environments and to the allocation of processors as a data processing system resource, the present invention also extends to a more generic modality in which a number of different system resources are modeled and defined in a consistent way across a number of different system levels.

In particular, it is noted that resources such as the amount of memory available may be defined as being available to a user as a hardware level resource. It is also noted that resources such as virtual memory or the number of CPUs available may be defined and modeled at the operating system level so as to provide a mechanism for user control of these resources in a direct fashion. Additionally, there are resources available at the administrative level, a level which overlies the operating system and is available in such systems as the assignee's IBM's RS/6000 SP product employing LoadLeveler as part of this administrative level. Resources now available at this administrative level include such items as available software licensing. This might occur for example in a situation in which a desired licensed application program has associated with it a contractual obligation that the program may not be run on more than N processors at the same time under the given license. Likewise it may be the case that a software license is limited by the requirement that the software run only on specified (and/or identified) processing units.

Additionally, users wanting to run large simulation programs often need to be able to keep all of the relevant simulation data in memory at the same time in order for the application to run efficiently. However, the allocation of memory as a resource has typically only been accomplished through the operating system, and has not been under user control. Furthermore, some jobs actually have a requirement that more than one CPU is involved in the computation.

In addition to placing all of these computer resources within greater control of a user, it is also very desirable that any such scheduling is done in a dynamic configuration without any requirements for rebooting or otherwise intervening with operating system functions.

In order to best understand the proper context in which the present invention operates, it is noted that the present invention does not operate at the microsecond or nanosecond time scales of the operating system. Rather, the present invention operates as a part of a macro scheduler operating above the operating system level. Nonetheless through the utilization of API-like (Application Program Interface) statements, proper communication with the operating system level is established in a consistent manner using a resource model which is applicable over several data processing system levels. In particular, the model employed by the present invention are such that resources are specified in terms of both type and amounts. Thus, there is typically a quantity or capacity associated with each one of the resources which are modeled in the present invention.

SUMMARY OF THE INVENTION

In accordance with a preferred embodiment of the present invention a method for managing resources in a data processing system comprises an initial step of defining at least one type of resource together with a quantity which is associated with that resource type. This quantity is indicative of resource capacity. The resource is either a hardware level resource, an operating system level resource, an application level resource an a user level resource. A determination is made as to whether a user has requested the use of one of these resources. Then the availability of the requested resource is determined with respect to its indicated type and quantity. Finally a user job is dispatched in accordance with the available resource type and quantity.

The present invention functions by providing a consistent resource model which extends across multiple data processing systems levels (hardware through operating system through administrative and finally through user levels). The resource model provided herein is defined in terms of type and quantity. The model is invoked through the utilization of API like statements provided by the user (or their interactive equivalents). These statements are analyzed in order to determine the requested resource usage. These analyzed statements are then used to schedule and to run jobs which use the specified resources. The power and flexibility of the present invention derives from the fact that a range of resource types is modeled in a consistent fashion across a number of data processing system levels particularly with respect to the incorporation of type and quantity specifications and in the modeling of a large variety of resources which are contemplated as being handled in accordance with the present method.

Accordingly, it is an object of the present invention to provide users with greater control of how their applications are run.

It is also an object of the present invention to provide a better match between application programs and the resources which they require in a data processing system complex.

It is also an object of the present invention to permit a user to control the number of processors employed in the running of the user's application program particularly in those environments in which there are a plurality of processors such as in a symmetric multi processor (SMP) architecture.

It is also an object of the present invention to permit users to control the type and amount of resources that a job consumes whether or not the resource is real or virtual.

It is a still further object of the present invention to provide a mechanism for accommodating constraints associated with limited software program licenses.

It is a still further object of the present invention to permit a user to control the amount of real or virtual memory used in processing a job or task.

It is also an object of the present invention to control the utilization of hardware resources by a user in a dynamic fashion which does not require either rebooting or operating system intervention.

It is a still further object of the present invention to provide a consistent resource model operable over a plurality of layers in a digital processing computer system or complex.

It is also an object of the present invention to improve the utilization of symmetric multi processing system environments.

It is also an object of the present invention to permit real time modification of resource requirements with respect to both type and to quantity.

Lastly, but not limited hereto, it is an object of the present invention to provide a mechanism for recovery of allocated and requested resources upon job and/or task completion.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
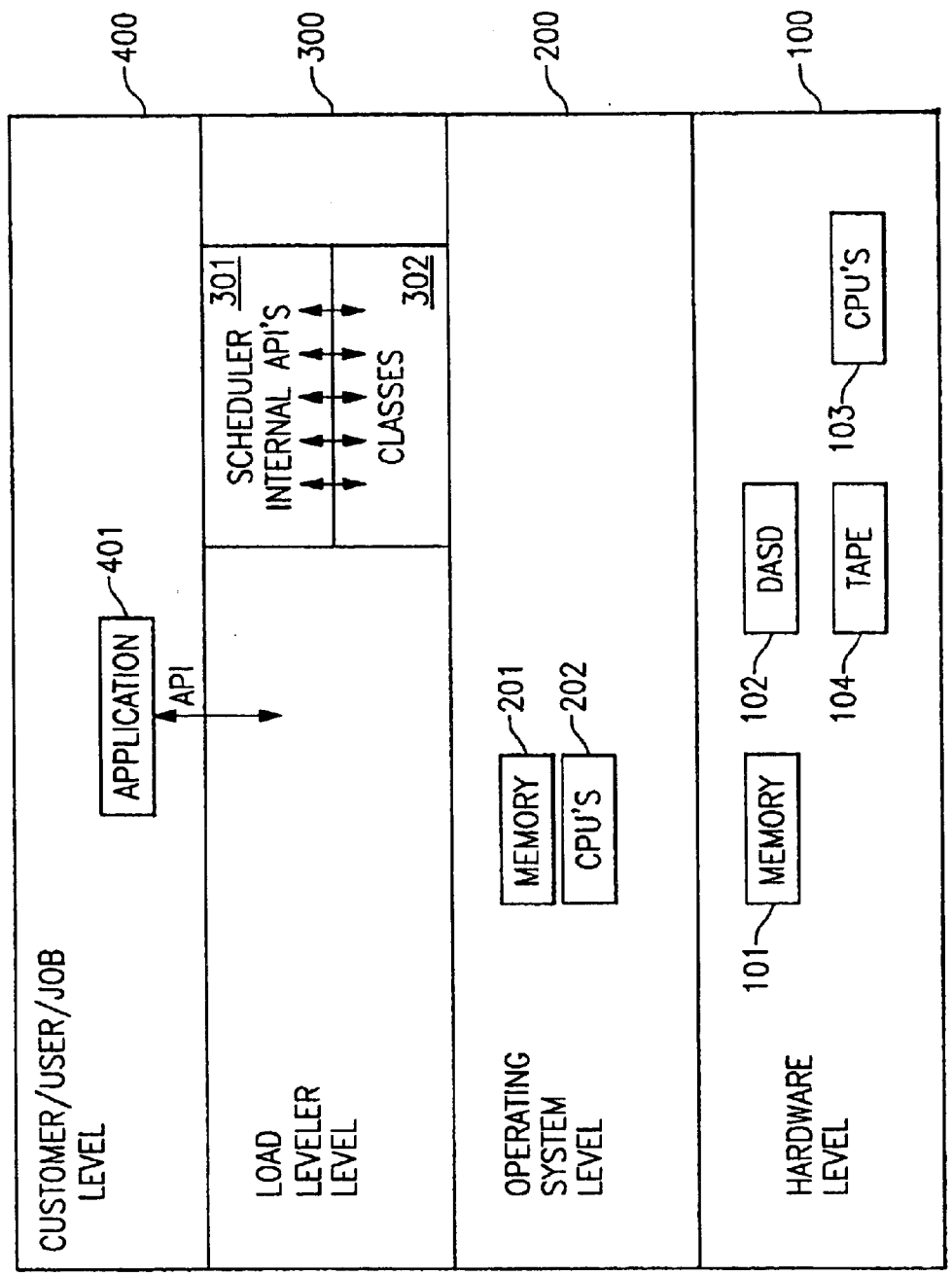
FIG. 1 is a block diagram illustrating the embodiment of the environment in which the present invention is employed and particularly illustrating its utilization across several hierarchical layers found in data processing systems.

FIG. 1 illustrates the environment in which the present invention is employed. In particular, FIG. 1 illustrates a data processing environment which includes a plurality of levels. At the lowest point there is hardware level 100. On top of level 100 there is a operating system level 200. Additionally, there is a administrative level 300 which interacts with customer, user or job level 400. Applicants submit software applications to the data processing system through means of administrative level 300. In particular, in preferred embodiments of the present invention administrative level 300 is provided by a product offered by applicants assignee called LoadLeveler. LoadLeveler interacts with an applicant through the utilization of various Application Program Interfaces (APIs). These APIs may be invoked by an application or user either via keyboard commands or alternatively via interactive movements of another input/output device such as a mouse, joy stick, stylus, light pen, graphics tablet or the like. Administrative level 300 includes scheduler 301 which employs a number of class definitions 302 with which scheduler 301 interacts, typically by means of internal APIs which are not available to the user in a direct fashion. Operating system level 200 typically manages resources such as memory 201 particularly in the form of virtual memory and also manages the CPU resource availability. Likewise, at hardware level 100, resources include such things as memory 101 disk storage or DASD 102, tape drive 104 and CPUs 103. The CPU management at operating system level 200 and hardware level 100 are not the same. This is why a resource such as CPUs is present at both the hardware and operating system levels.

Figure 2:
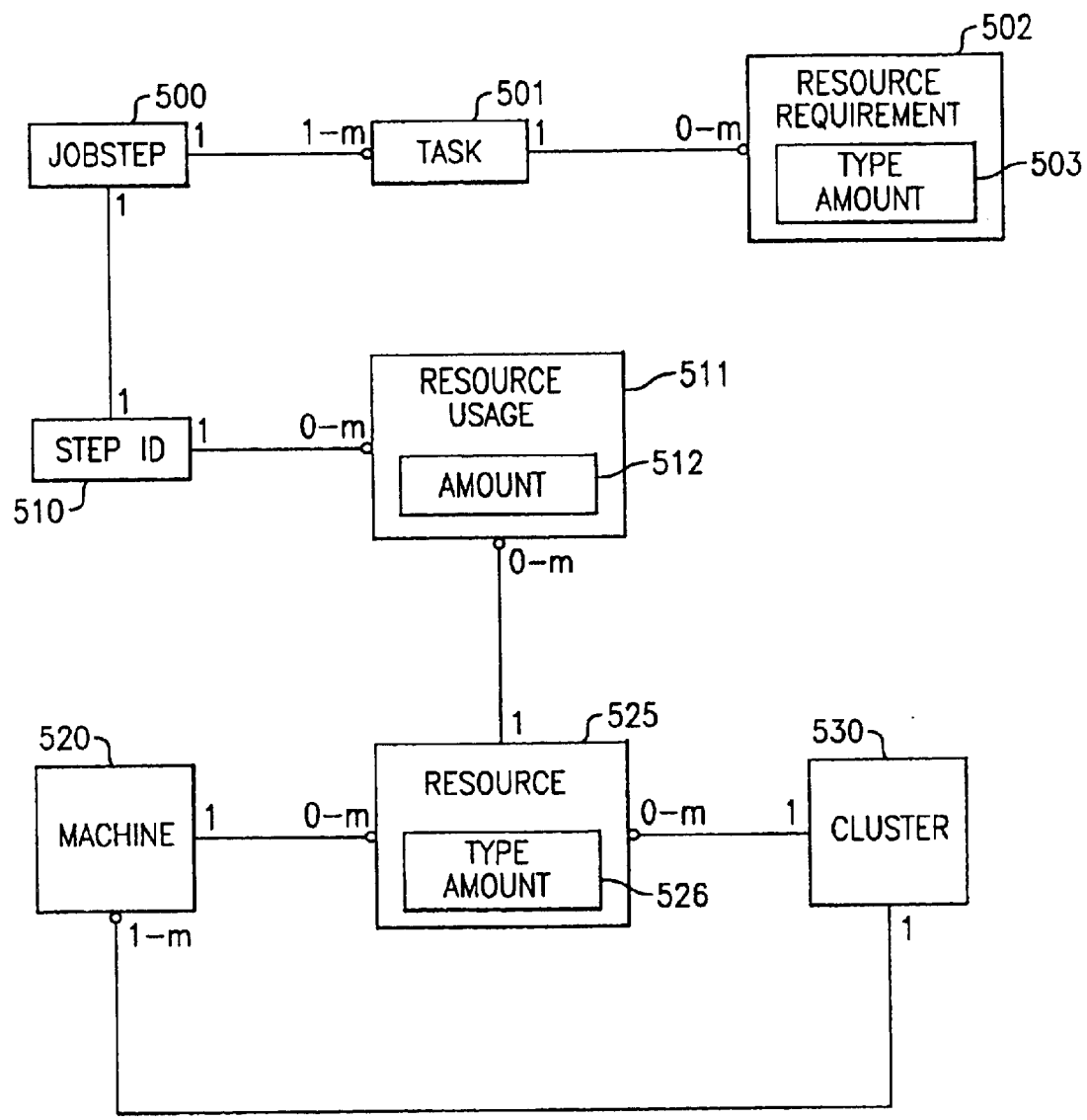
FIG. 2 is a block diagram illustrating the resource model employed in the present invention and more particularly illustrating the utilization of that model in its relationship to various parts of the system.

Consideration is now given to a discussion of the resource model used in the present invention which is described in FIG. 2. FIG. 2 illustrates the model in terms of the relation between various objects in the resource model employed herein. As a general comment the lines drawn between the various software component objects shown illustrate a "has" relationship. Furthermore the numbers adjacent to the boxes and the lines indicate the nature of the relationship. In particular it may be a one-to-one relation or in other cases it may be a one-to-N relationship where N sometimes varies between 1 and n and other times it varies between 0 and n. In particular, job step 500 has one or more tasks. Each job step 500 has one step identifier 510 (or stepid meaning "step identifier" or "step ID"). Each task 501 has 0 or more resource requirements 502. Each resource requirement in accordance with the present model is characterized by both a type and amount 503. A machine 520 has zero or more resources 525. And again each resource rather is characterized with type and amount information 526. Cluster 530 has one or more machines 520. Each resource is characterized by both a type and an amount. Resource 525 has 0 or more resource usage's 511. Each resource usage is characterized by amount 512. And a resource usage has one step identifier (stepid) 510.

Resources are defined at the discretion of the administrator, representing either physical characteristics of a machine or virtual characteristics meaningful for the system and the workload represented. The resources are defined in accordance with available in a specified quantity on a specific machine or are defined to be available aggregately or on any of the machines defined to the system. For example, resources may be defined to represent any of the following identities:

1. The number of processors in a symmetric multi processing (SMP) machine;
2. The amount of real memory available on a machine;
3. The amount of virtual memory defined on a machine;
4. The number of installed software licenses available on a machine;
5. The number of installed floating software licenses available aggregately or on the set of machines defined to the system; and
6. Any other named, quantifiable entity that is meaningful to the scheduling of jobs on machines that are defined to the system.

Scheduling of jobs is based on their requested resource consumption with scheduling directives being provided in a flexible manner. In particular, users specify the type and amount of resource that each job consumes when running. To facilitate parallel applications resource specification is made based on the amount of each indicated resource which is anticipated to be consumed by each process of the user's application program. Administrators specify which resources (of those defined) are to be considered when scheduling jobs. A job is scheduled to run on machine(s) based on two factors:

1. scheduling directives indicating which defined resources to consider;
2. sufficiency of those resources based upon the job's requests to consume a specified amount of these resources per each of its processes or tasks. Availability of resources is constrained by consumption of resources by currently running jobs.

Consumption of resources during job execution and the restoration of resource availability upon job completion is also provided. In particular, resources are said to be consumed by a job and are considered to be exclusively used by the job during its execution. This renders these resources unavailable for consumption by another job unless or until the job consuming the resource completes or is otherwise canceled by the user or terminated by the system. At that time, the resources consumed by that job are restored to the system and become available for future consumption by other jobs which are scheduled to run.

The accessibility to real time resource availability information is also provided in the present invention. In particular, resource availability information is made accessible via APIs so that an external scheduler or other resource monitoring an application may utilize that information. In addition, users may access resource availability via commands. Availability information is provided in a real time fashion so as to represent resources available at the time that the request for information is made regardless of the means of that request, taking into consideration the resources initially defined and those currently consumed by actively running jobs.

Adaptability for changing resource definitions is also made available as a means for affecting job scheduling. In particular, the method of the present invention accommodates real time modification of the resources and the quantities associated therewith such that the scheduler adapts to changes in availability while still continuing to attempt to schedule jobs. This reconfiguration process allows the increase or decrease of available resources regardless of the amounts of those resources which are currently defined to be available and which are considered to be consumed by running jobs. Thus resources may be removed from the configuration or their available capacity levels are reduced below that which is currently in use by running jobs.

Recovery capability is also provided by the present invention. For example in the event that there is a failure of the job scheduling system such that a predefined alternate scheduler takes over for one that has failed, currently executing jobs send information to the new scheduler indicating their resource consumption. This prevents the new scheduler from scheduling jobs that consume resources which are actually in use by already actively running jobs.

From the above comments it should be appreciated that the model of the resource objects as provided by the present invention as illustrated herein provides all of the advantages listed above. It is further seen that the objects of the present invention, as described above, are also met. In particular, it is seen that the present invention puts much greater flexibility and control in the hands of an application program, author and/or user.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for managing resources in a multiprocessor data processing system, said method comprising the steps of:

defining to multiprocessors in said data processing system at least one resource, together with a quantity and type associated with that resource, said quantity being indicative of resource capacity, said resource also having a level selected from the group consisting of hardware level, operating system level, administrative system level and application level;

determining whether an application level user has requested use of said at least one resource;

determining availability, among said multiple processors, of said requested resource as to level, type and quantity; and dispatching a user job which requests said resource upon the condition that said determining of availability indicates that said resource is available at the level and in the type and quantity requested.

2. The method of claim 1 in which said hardware level includes resources selected from the group consisting of CPUs and random access memory.

3. The method of claim 1 in which said operating system level resource includes virtual memory.

4. A method for providing an application level user with control of a data processing system having multiple processors, said method having the steps of:

analyzing user supplied command statements which provide access to resources having internal resource models, said resource models including, for each resource, a level, type and quantity description, wherein at least one resource model is defined consistently among said multiple processors, said level being selected from the group consisting of hardware level, operating system level, administrative level and application level;

interpreting said command statements so that user jobs are scheduled to run and to use resources specified by said command statements dispatching at least one of said scheduled user jobs, whose interpreted command statements specify at least one resource in said internal resource models, upon condition that said interpreting indicates that said specified resource is available at the level and in the type and quantity specified.

* * * * *